UNITED STATES PATENT OFFICE.

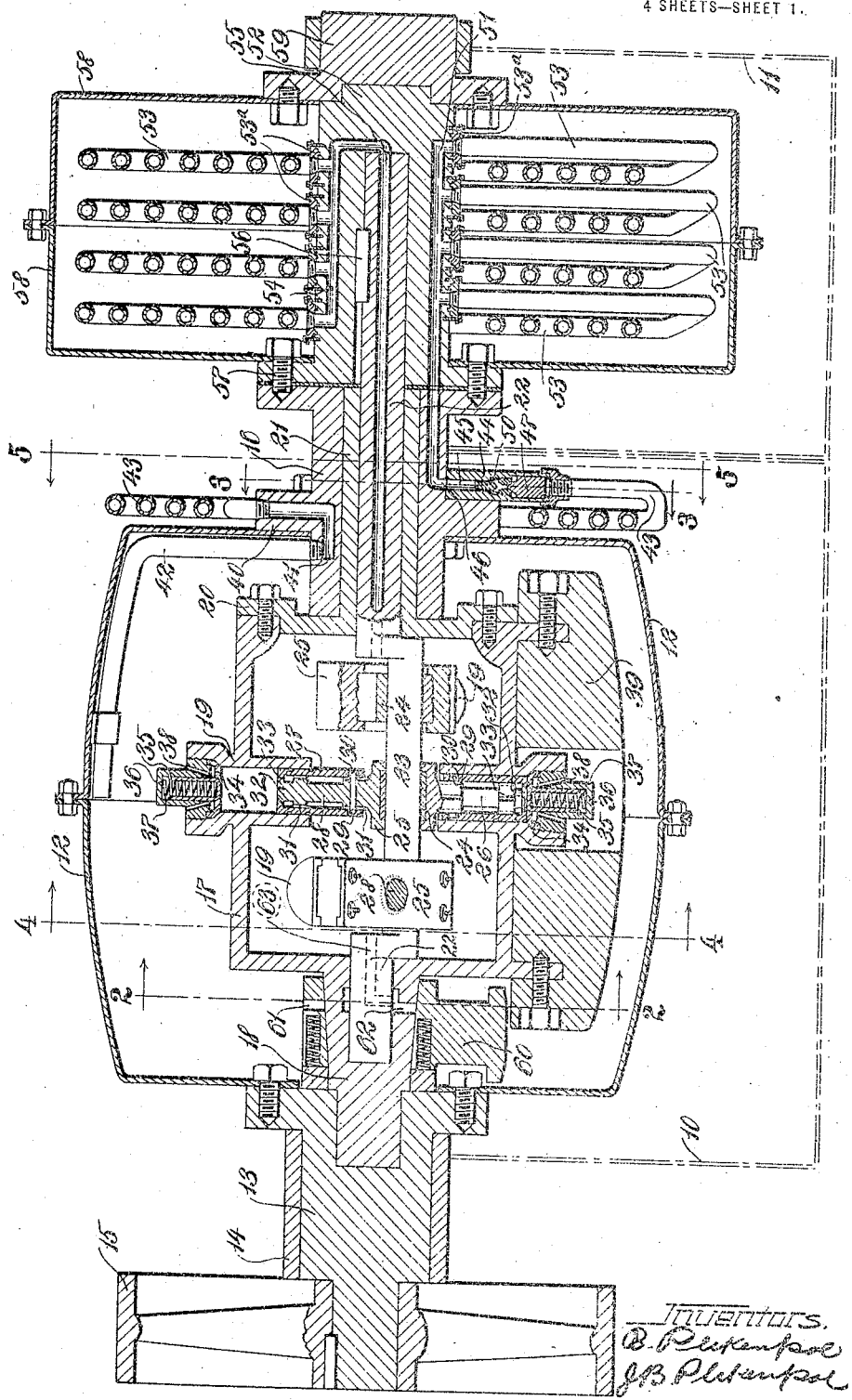

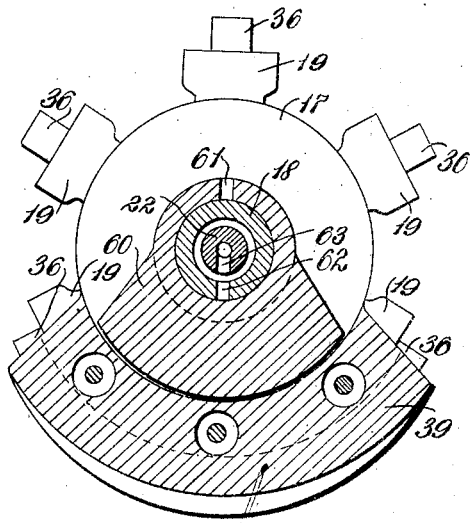
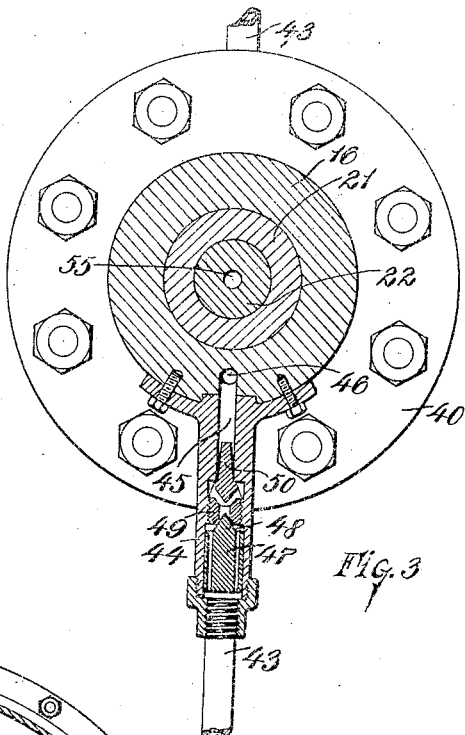
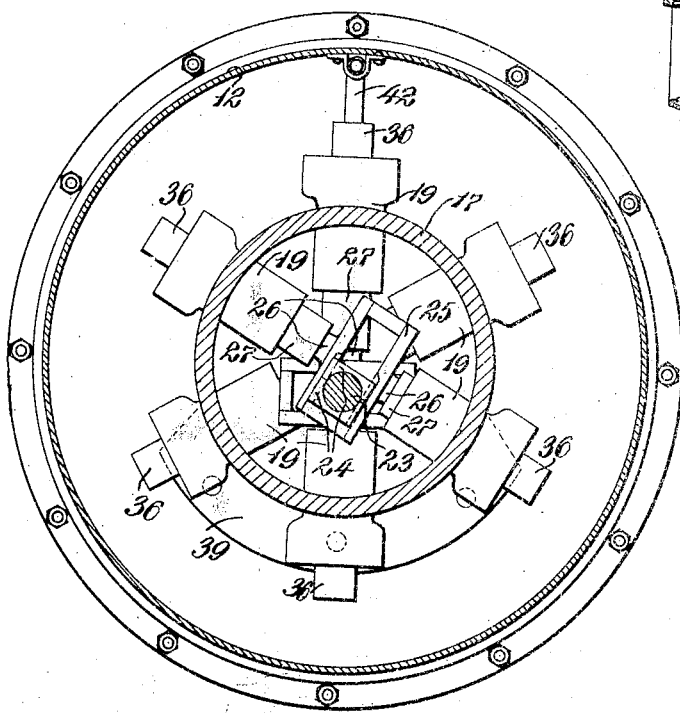
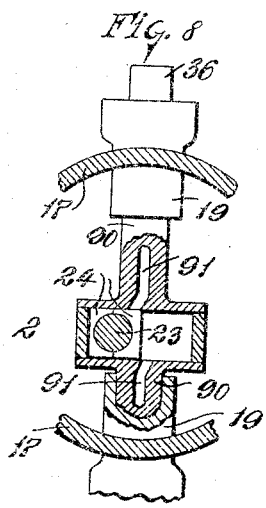

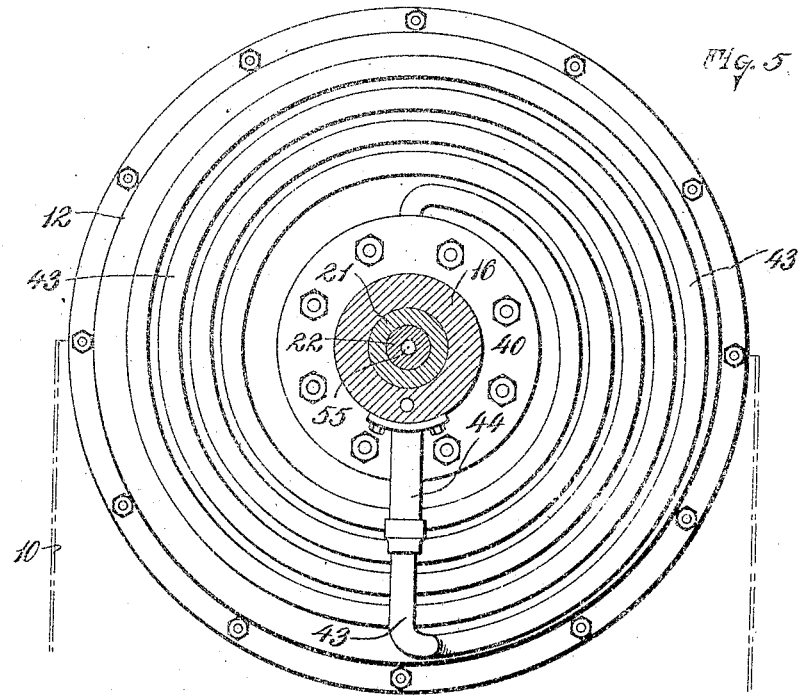
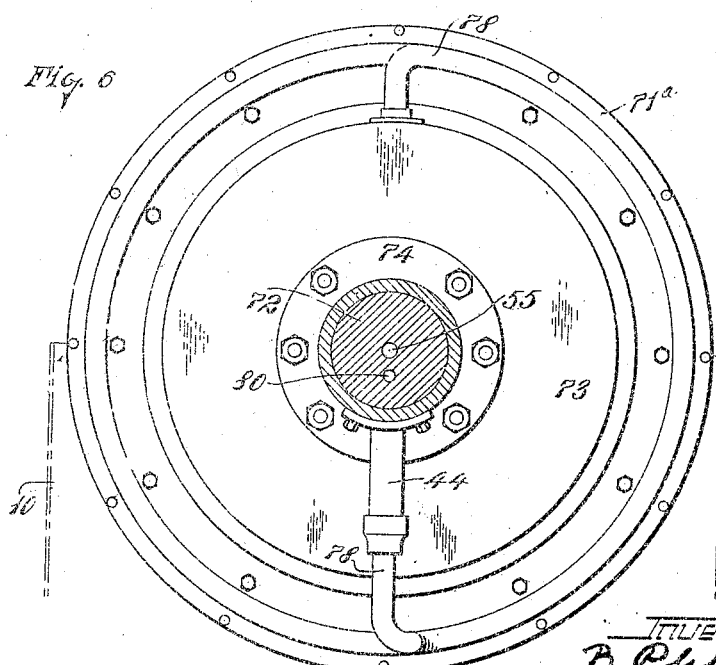

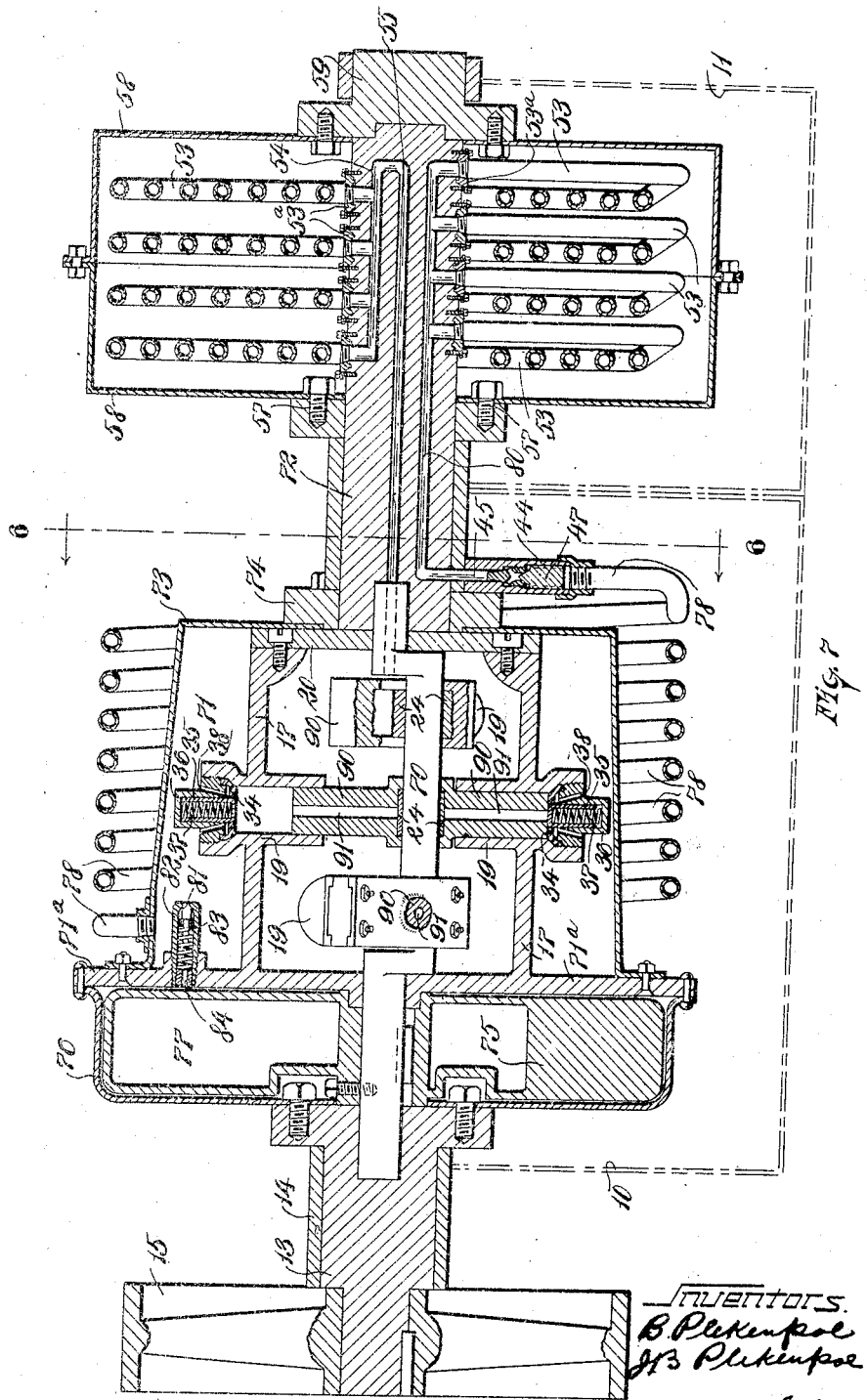

BERNARD PLEKENPOL AND JOHN B. PLEKENPOL, OF CLEVELAND, OHIO.

REFRIGERATING APPARATUS.

1,204,061.    Specification of Letters Patent.    Patented Nov. 7, 1916.

Application filed October 7, 1915. Serial No. 54,630.

*To all whom it may concern:*

Be it known that we, BERNARD PLEKENPOL and JOHN B. PLEKENPOL, citizens of the United States, residing at Cleveland, in the county of Cuyahoga and State of Ohio, have invented a certain new and useful Improvement in Refrigerating Apparatus, of which the following is a full, clear, and exact description, reference being had to the accompanying drawings.

This invention relates generally to refrigerating apparatus and more particularly to one which on account of its size, construction and ease of operation is especially adapted for use in the household, cafés, lunch rooms and the like.

The object of the invention is to provide an exceedingly simple device, one which will be durable and easy to operate and at the same time inexpensive.

With these objects in view the invention consists in the novel features of construction and combination all of which will be fully described hereinafter and pointed out in the claims.

In the drawings forming a part of this specification, Figure 1 is a vertical longitudinal sectional view of one form of our refrigerating apparatus; Fig. 2 is a detail section on the line 2—2 of Fig. 1; Fig. 3 is a detail section on the line 3—3 of Fig. 1; Fig. 4 is a sectional elevation on the line 4—4 of Fig. 1; Fig. 5 is a sectional elevation on the line 5—5 of Fig. 1; Fig. 6 is a sectional elevation on the line 6—6 of Fig. 7; Fig. 7 is a longitudinal sectional view of a modified form of apparatus, and Fig. 8 is a detail view of piston and yoke employed in form illustrated in Fig. 7.

In carrying out our invention we employ two tanks 10 and 11 preferably side by side the tank 10 being adapted to contain water while the tank 11 contains a strong solution of brine which is piped and circulated in any desired manner for refrigerating purposes. Within the tank 10 the condenser is rotated while in the tank 11 we rotate the vaporizer, the condenser and vaporizer being connected and rotated from a common source and the refrigerating medium passes from the condenser into the vaporizer and is then sucked back and recompressed after the usual method of devices of this character. While we utilize this alternate method of vaporization and condensation in our apparatus the means whereby we accomplish these operations possesses certain points of novelty which we shall now describe in detail.

The condenser consists of a sheet metal shell 12 composed of two similar sections bolted together and at one end the shell is rigidly secured to a journal 13 which turns in a suitable bearing 14 being driven by a pulley 15 receiving its power from any suitable source. We prefer to make the condenser of sheet metal as it has sufficient tensile strength, and being thinner than cast iron can be cooled much more readily. The opposite end of the shell is connected to a casting 16, the construction and function of which will be explained more fully hereinafter.

Within the condenser is arranged a cylindrical casing 17 preferably of cast metal and closed at one end, said closed end having a tapered hub portion 18 terminating in a trunnion within the journal 13, the journal 13 serving as a bearing for the journal portion of the casing which in reality constitutes the suction chamber of our apparatus and preferably has cast integral therewith the compression cylinders 19 hereinafter to be described in detail. The open end of the casing or chamber 17 is closed by means of a circular plate 20 bolted to the end of the casing or chamber as shown, and this plate 20 has an integral tubular bearing portion 21 which passes through the casting 16, and in which turns the shaft 22, one end of this shaft extending into the vaporizer while the other end thereof is journaled in the tapering hub portion of the casing 17, and within the casing or chamber 17 this shaft is cranked as indicated at 23.

In practice we may employ any number of cylinders, six being shown in the drawings for purposes of illustration, said cylinders being arranged in pairs at diametrically opposite points and each pair spaced from the next adjacent pair a distance of 60° as most clearly illustrated in Fig. 4. By this arrangement we are able to distribute the cylinders equidistant over the cylindrical portion of the casing constituting the suction chamber (see Fig. 4). Upon the crank portion of the shaft at equidistant points we mount the blocks 24 sliding in the yokes 25 and connected to the opposite sides of each yoke are the oppositely disposed pistons 26, which work back and forth in the inner portion of the cylinder the outer portion of said cylinder being located upon the outside of the casing 17, within the condenser and containing the valve mechanism by means of which the compressed vapors are discharged into the condenser. The cylinders being arranged in pairs opposite each other it is obvious that as the crank shaft is rotated the pistons are alternately moved in and out of the cylinders and in Fig. 1 we have shown each piston as consisting of a tubular member 27 and a solid member 28 arranged centrally therein the central solid member 18 being integral with the yoke if desired. The outer tubular member and the central solid member are united by means of a cross pin 29 passing through the solid portion and having a limited movement in the apertures 30 produced in the tubular member. The member 28 fits snugly within the tubular portion 27 at its inner and outer ends and is reduced intermediate its ends as shown and the portions thereof which fit snugly are grooved as indicated at 31 so that the vapor in the chamber can pass through into the compression cylinder the upper end of the piston carrying a tapered valve 32 which is adapted to engage the seat 33 formed at the outer end of the tubular portion 27, and upon the suction stroke of the piston within the cylinder the valve is unseated and the vapors pass through the tubular portion of the piston into the cylinder and upon the next stroke the said vapors are compressed and forced through the discharge valve 32 into the condenser. The outer end of the cylinder or that portion within the condenser is preferably slightly larger than the portion within the casing and has an apertured valve seat 34 arranged therein within which seats the valve 35 carried by a cap or plug 36 which is secured into the threaded end of the cylinder and which fits upon the seat 34 and holds the same in place; a spring 37 bearing upon the valve and normally holding the same seated. The end of the cap or plug 36 is spaced slightly from the valve seat or ring 34 and this cap or plug is provided with ports or passages 38 through which the compressed vapor is forced upon the compression stroke of the piston within the cylinder as the valve 35 is unseated and the fluid or compressed vapor passes through the apertured seat out through the ports or passages 38 into the condenser and in this manner the refrigerating fluid is sucked in and compressed and condensed and liquefied. The condenser as previously stated revolves in the water contained within the tank and the crank shaft is rotated in a manner hereinafter explained but the suction chamber or casing 17 in Fig. 1 normally remains stationary, and in order to so maintain the same we attach a weight 39 to one side of the cylindrical casing or chamber by means of bolts passing into the flanges as shown in Fig. 1, there being an opening formed in the weight to receive a central cylinder. By gravity, therefore, the cylindrical casing or suction chamber will be held stationary while the condenser, shaft and vaporizer rotate. The casting 16, previously referred to, is formed with a flange 40 to which the condenser shell is secured and this casting extends into the shell and contacts with the end of the plate 20, and is formed with a passage 41, to the inner end of which is attached a pipe 42 arranged within the condenser, the purpose of this pipe being to collect the condensed and liquefied refrigerating fluid and convey the same through the passage 41 into the condensing coil 43 having its receiving end secured in the outer end of the passage 41 in the flange 40 and this coil is carried around in convolute form the desired number of times and connected at its outer end to a valve casing 44 which is bolted to the opposite side of the casting 16 and has its discharge passage 45 communicating with the passage 46 formed in said casting (see Fig. 3). Within the casing 44 is a valve 47 having a tapered end 48 adapted to seat against a ring 49 located within the casing. The casing also carries a double faced movable valve 50 which is adapted to close the passage 45 and also contact with the ring seat 49. The valve 47 has exterior grooves which permit the passage of the liquid when the valve is unseated, and when the machine is in operation this valve 47 is normally unseated by centrifugal force so that the refrigerating fluid passes readily from the condensing coil past this valve and the valve 50 which is also provided with grooves, and in this manner passes into the passage 46 which communicates with the passage 51 formed in a casting 52 to which the vaporizing coils 53 are connected by the flanges 53ª these coils being connected at different points and given as many convolutions as desired and then connected by flanges 53ª to the opposite side of the casting 52 where they communicate with the passage 54 formed in the casting 52 and communicate with the central passage 55 produced in the shaft 22, the shaft being rigidly connected to the casting 52 by means of a key 56, and the casting 52 is united to the casting 16 by bolts 57 and at the same time the two-piece shell 58 which surrounds the vaporizing coils is connected to the casting 52. A journal 59 is secured to the end of the vaporizing shell receives the end of casting 52 and serves to support the machine at that end, any suitable bearing being employed in connection with this journal 59.

In order to prevent excessive pressure within the condenser we arrange a weighted collar 60 upon the hub portion 18 of the cylindrical casing 17 said weighted collar having an aperture 61 which is adapted to communicate with the passage 62 formed in the hub portion 18, and which in turn communicates with the passage 63 produced in the adjacent end of the shaft and communicating with the suction chamber. Excessive pressure within the condenser is avoided by this construction inasmuch as the casing 17 and shaft 22 will rotate together whenever excessive pressure takes place, and when the aperture 62 in the hub comes into register with the opening 61 the excess pressure passes through the passages 61 and 62 and passage 63 back into the suction chamber, thereby equalizing pressures and relieving excessive pressure within the condenser.

In the illustration in Fig. 7 there is a slight difference in the construction of the apparatus although none whatever in the mode of operation and result. In the apparatus as therein constructed, the tanks 10 and 11 are exactly the same and likewise the journal 13, bearing 14 and pulley 15 for driving the apparatus. The cylinders 19 are constructed and arranged identically the same and are operated through the medium of a crank shaft 70 which has one end passed through the end of suction chamber 71 and journaled in the main journal 13 as most clearly shown; the opposite end of the shaft 70 being journaled in a casting 72 hereinafter more fully described. The suction chamber 71, at one side is formed with a flange portion 71ª to which the shell 73 of the condenser is secured, the opposite end of said shell being securely fastened to the end of suction chamber by means of a flange 74 through which the bolts are passed, this flange 74 surrounding the end of casting 72 where the same contacts with the end of the suction chamber.

A weight 75 is securely fastened to the end of the shaft 70 passing through the end of the suction chamber, said weight 75 being inclosed by a shell 76 bolted to the opposite side of the flange 71ª and to the journal 13, this weight 75 being made with a hollow portion 77 in order to fill the space between the flanged end of suction chamber and the shell 76. The refrigerating vapor fluid after being compressed into the cylinder 19 and forced into the condenser passes into the coiled pipe 78 which enters the condenser at the rear end and is coiled around said condenser a number of times, and then connected to the valve casing 44 which is identical in construction and contains the same construction of valves as illustrated in Fig. 3, and identical in operation. The discharge passage 45 leading from the casing 44 communicates with a passage 80 formed in the casting 72 which passage 80 communicates at the desired number of points with the vaporizing coils 53 constructed and arranged exactly the same as previously described and being contained within a shell 58. These vaporizing coils 53 at their opposite ends communicate with the passage 54 the same as previously described, said passage 54 being given return bend as shown and communicating with the passage 55 produced in the end of the crank shaft which is journaled in the casting 72 so that the refrigerating fluid, vaporized in the vaporizer is sucked back into the passages 54 and 55 into the suction chamber and from there into the condenser through the cylinders and pistons and out through the condenser coils back to the vaporizer again, same as previously described.

In Figs. 7 and 8 we have shown a slightly modified form of piston operating in the cylinder, said piston 90 being integral with the yoke and having a passage 91 extending therethrough said passage being slightly inclined at its inner end, and the block working in the yoke serves as a cut off for this passage, closing said passage as the piston is forced into the cylinder, thereby compressing the vapors and forcing them out into the condenser. The discharge valve at the end of cylinder is just the same as previously described.

A safety valve 81 is arranged in a casing 82, secured in the flange 71ª and extends into the condenser, said valve being normally held seated by a spring 83 held in place by an apertured plug 84. The function of this safety valve is to relieve excessive pressure and when the pressure exceeds the tension of the spring 83, the valve 81 is unseated and the refrigerating fluid or vapors escape through the apertured plug 84 and down between the flanged end of the cylindrical casing or suction chamber and the weight and is drawn in through the suction chamber around the side of the crankshaft, there being sufficient space between the crankshaft and bearing. In this way the excessive pressure within the condenser is relieved.

In the device herein shown and described, the shaft remains stationary, being held in such position by the weight 75 while the condenser and vaporizer revolve around said shaft within their respective tanks.

In practice, we prefer to lubricate the moving parts by the employment of a suitable lubricant in the refrigerating fluid wherever the refrigerating fluid itself does not contain lubricating properties. Some lubricating fluids such as carbon-sulfid are in themselves lubricants, whereas in others it is advisable to incorporate a definite amount of lubricant therewith. We also prefer to construct the shafts 22 and 70 with fine spiral grooves along which the lubricant can be fed. The pistons are also provided with lubricating grooves instead of packing rings.

Having thus described our invention, what we claim is:—

1. In a device of the kind described, the combination with a suction chamber, of a condensing chamber surrounding the same, compression cylinders carried by the suction chamber and communicating with the suction and condensing chambers, pistons working in said cylinders, a shaft arranged within the suction chamber and operatively connected with said pistons and means for carrying the condensed refrigerating fluid from the condensing chamber as set forth.

2. In a device of the kind described, the combination with a suction chamber, of a condensing chamber surrounding the same, said suction chamber carrying a compression pump, said pump communicating with both the suction and condensing chambers, a piston working therein, a shaft arranged in the suction chamber and operatively connected with the piston and vaporizer, and means for conveying the condensed refrigerating fluid from the condenser to the vaporizer.

3. In a device of the kind described, the combination with a suction chamber, of a condensing chamber surrounding the same, a compression cylinder carried by the suction chamber and communicating with the suction chamber and the condensing chamber, a piston working therein, a shaft arranged in the suction chamber and operatively connected with the piston, a vaporizer, means for conveying the condensed fluid to the vaporizer together with means for conveying the vapor to the suction chamber.

4. In a device of the kind described, the combination with a suction chamber having a plurality of compression cylinders, each cylinder having a valved outlet, a piston working in each cylinder, a shaft arranged within the suction chamber and operatively connected with the pistons, a rotary condensing chamber surrounding said suction chamber, a rotary vaporizer and means connecting said condenser and vaporizer together with means for conveying the condensed fluid from the condenser to said vaporizer.

5. In a device of the kind described, the combination with a suction chamber having a plurality of compression cylinders, each cylinder having a valved outlet, a piston working in each cylinder, a shaft arranged within the suction chamber and operatively connected with said pistons, a rotary condenser surrounding the suction chamber, a rotary vaporizer and means connecting said condenser and vaporizer, means for conveying the condensed fluid from the condenser to the vaporizer, and a weight for maintaining an operative relation between the shaft and pistons as set forth.

6. In a device of the kind described, the combination with a suction chamber carrying a plurality of compression cylinders, of a piston working in each cylinder, a crank shaft arranged in the suction chamber, yokes connecting said shaft and pistons, an outlet valve for each cylinder, a condensing chamber surrounding the suction chamber and into which the outlet valves of the cylinders discharge, a vaporizer, means for connecting the vaporizer and condenser, means for conveying the condensed fluid from the condenser to the vaporizer, means for returning the vaporized fluid from the vaporizer to the suction chamber, means for rotating the condenser and vaporizer in unison together with means for maintaining the crank shaft stationary under normal conditions.

7. In a device of the kind described, the combination with a suction chamber having a plurality of compression cylinders communicating therewith, each cylinder having a valved outlet, a piston arranged in each cylinder and adapted to admit a compression fluid within the cylinder, a crank shaft arranged within the suction chamber, yokes connected with the pistons and movable upon said crank shaft, a vaporizer and means for connecting said condenser and vaporizer whereby they rotate in unison, means for conveying the refrigerating fluid from the condenser to the vaporizer, and means for conveying the vaporized fluid from the vaporizer to the suction chamber through the crank shaft as set forth.

8. In a device of the kind described, the combination with a suction chamber having a plurality of compression cylinders, each cylinder having a valved outlet, a piston working in each cylinder, a block arranged upon the crank shaft and a yoke connected to the piston and in which the block works, a condenser surrounding the suction chamber, means for rotating said chamber, and means for maintaining the crank shaft stationary under normal conditions.

9. In a device of the kind described, the combination with a suction chamber having a plurality of compression cylinders provided with valved outlets, a crank shaft arranged within the suction chamber, a piston arranged in said cylinders and operatively connected with crank shaft, a condenser surrounding the suction chamber and means for rotating the same, means for maintaining a movable relation between the crank shaft and suction chamber under normal conditions together with means for permitting the escape of refrigerating fluid back into the suction chamber under excessive pressure.

10. In a device of the kind described, the combination with a suction chamber having a plurality of oppositely disposed compression cylinders, each having an outwardly discharging valve at its outer end, of a piston working in each cylinder, each pair of pistons being connected to a yoke, a crank shaft arranged in the suction chamber, each yoke being connected to said crank shaft, each piston being constructed to permit the passage of fluid into the cylinder and compress the same therein, and a condenser surrounding the suction chamber, a vaporizer, means for connecting said condenser and vaporizer, and means for conveying the refrigerating fluid from the condenser to said vaporizer back again to the suction chamber as set forth.

11. In a device of the kind described, the combination with a suction chamber, of a condenser surrounding the same, a vaporizer, said condenser and vaporizer being rotatable in unison, means for conveying the condensed refrigerating fluid to the vaporizer, said means having a discharge valve normally opened during rotation and adapted to control the discharge of condensed vapors to the vaporizer.

12. In a device of the kind described, the combination with a suction chamber having a plurality of compression cylinders provided with valved outlets, said cylinders being arranged in oppositely disposed pairs, pistons working in said cylinders, yokes connecting each pair of pistons, a crank shaft arranged in said suction chamber and working in the yokes, a condenser surrounding said suction chamber, a condensing coil leading from said condenser, a vaporizer comprising a casting, a plurality of coils and a casing, said vaporizer and condenser being rotatable in unison, valve controlled means for conveying the condensed fluid to the vaporizer together with means for conveying the vaporized fluid to the suction chamber through the crank shaft.

13. In a device of the kind described, the combination with a rotary condenser, and a rotary vaporizer and a condensing oil leading from the condenser to the vaporizer, a valve at the discharge end of said coil, said valve being opened by centrifugal force during rotation as set forth.

14. A device of the kind described comprising a water tank and a brine tank, a condenser rotatable in the water tank and a vaporizer rotatable in the brine tank, said vaporizer and condenser being connected together, a suction chamber arranged within the condenser, means carried by said suction chamber for sucking and compressing vapors, means for discharging the compressed vapors into the condenser, together with means for relieving excessive pressure within the condenser.

15. In a device of the kind described the combination with a pair of cylinders, of pistons working therein, each piston having a passage therethrough, a yoke connecting said pistons and having openings communicating with the piston passage, a crank shaft and a block on said shaft in said yoke, and adapted to cut off the piston passage as set forth.

16. In a device of the kind described the combination with a condenser and vaporizer connected together and adapted to rotate in unison, a suction chamber arranged within the condenser, one or more compression cylinders carried by said suction chamber, a crank shaft arranged in said suction chamber, a piston for each cylinder operatively connected with said crank shaft, valve controlled means for conveying the condensed vapors from the condenser to the vaporizer, said valve being opened by the rotation of the device, and means including the crank shaft for conveying the vaporized fluid from the vaporizer to the suction chamber.

17. In a device of the kind described the combination with a condenser and vaporizer, a suction chamber arranged within the condenser and adapted to discharge a compressed fluid into the condenser through the medium of one or more compression cylinders, a piston for each cylinder constructed to admit and compress vapors, a crank shaft arranged in the suction chamber and operatively connected with each piston, means for conveying the condensed vapors from the condenser to the vaporizer, a valve arranged in said conveyer, said valve being operated by centrifugal force, means including the crank shaft at one end for conveying the vaporized fluid from the vaporizer to the suction chamber, and means including the opposite end of the crank shaft for relieving excessive pressure in the condenser.

In testimony whereof, we hereunto affix our signatures in the presence of two witnesses.

BERNARD PLEKENPOL.
JOHN B. PLEKENPOL.

Witnesses:
Chas. E. Brock,
Hugh B. McGill.